US006952771B1

(12) United States Patent
Zuccherato et al.

(10) Patent No.: US 6,952,771 B1
(45) Date of Patent: Oct. 4, 2005

(54) SHARED DATA INITIALIZATION QUERY SYSTEM AND METHOD

(75) Inventors: Robert Zuccherato, Ottawa (CA); Adrian Mancini, Nepean (CA)

(73) Assignee: Entrust Limited, Ottawa (CA)

( * ) Notice: Subject to any disclaimer, the term of this patent is extended or adjusted under 35 U.S.C. 154(b) by 0 days.

(21) Appl. No.: 09/478,254

(22) Filed: Jan. 6, 2000

Related U.S. Application Data

(63) Continuation-in-part of application No. 09/430,879, filed on Nov. 1, 1999.

(51) Int. Cl.[7] .............................................. H04L 9/00
(52) U.S. Cl. ..................................... 713/170; 713/168
(58) Field of Search .............................. 713/170, 171, 713/168, 155, 201

(56) References Cited

U.S. PATENT DOCUMENTS

| 4,771,461 A   | 9/1988  | Matyas           |         |
|---------------|---------|------------------|---------|
| 4,783,798 A   | 11/1988 | Leibholz et al.  |         |
| 6,038,319 A * | 3/2000  | Chari            | 380/33  |
| 6,226,383 B1* | 5/2001  | Jablon           | 380/30  |
| 6,378,072 B1* | 4/2002  | Collins et al.   | 713/187 |
| 6,564,323 B2* | 5/2003  | Takahashi et al. | 713/182 |
| 6,609,198 B1  | 8/2003  | Wood et al.      |         |

OTHER PUBLICATIONS

Co-pending Appl. No. 09/430,879, filed Nov. 1, 1999, Zuccherato et al.

* cited by examiner

Primary Examiner—Matthew Smithers
(74) Attorney, Agent, or Firm—Vedder, Price, Kaufman & Kammholz, P.C.

(57) ABSTRACT

A system and method stores inquiry data, such as data representing questions or forms containing questions, to facilitate entry of shared authentication data for initialization. The stored inquiry data is retrieved for presentation, in audible or visual form, based on received entity identification data entered, for example, by a user or otherwise obtained by a processing or entity seeking initialization. As such, the system and method produces an entity that, for example, first asks a user for identifying information. The entity identification information, such as an employee number, or other information, is then provided to the entity. This information is then sent to a processing unit, such as a certification authority or other server. The processing unit determines what questions must be asked of the user to identify the user for initialization purposes. These questions are returned to the terminal for application wherein they are presented to the user. Once the information is collected, the various responses are concatenated together to form one data object which is then used to identify the individual. The responses to the questions may be communicated in any type of PAKE type protocol, or any other suitable protocol.

16 Claims, 5 Drawing Sheets

SHARED DATA INITIALIZATION QUERY SYSTEM AND METHOD

CROSS REFERENCE TO RELATED CO-PENDING APPLICATION

This application is a continuation in part of co-pending application entitled "System and Method for Initializing Operation for an Information Security Operation", Ser. No. 09/430,879, filed on Nov. 1, 1999 by the same inventors, and owned by instant assignee.

FIELD OF THE INVENTION

The invention relates generally to systems and methods for registering entities to use an information security processor system, and more particularly to systems and methods for initializing operation of an information security operation for an entity, such as for registration for public key infrastructure information security systems.

BACKGROUND OF THE INVENTION

With the increased use of telecommunications systems, information security has become an important aspect of promoting communications over various communication links such as over the Internet, wireless links and other communication links. Ensuring that a particular entity, such as a user, software application, network node or other entity, is a proper entity that has proper authorization to use the information security system, has become an important consideration in designing information security systems. Present methods for registering entities for using information security operations, such as public key based information security systems, can involve distributing a reference value (RV) or other identifying information that may uniquely identify the entity, along with an initial authentication key (IAK) or some other authenticating information that is provided to the entity. initial authentication key (IAK) or some other authenticating information that is provided to the entity.

For example, when a user first signs onto a public key infrastructure system, out of band information such as the reference value (RV) and the initial authentication key (IAK) may be communicated through the mail, or other out of band mechanism to ensure that the information is not intercepted by an unscrupulous party. Initial authentication keys may be, for example, MAC keys used to authenticate a user that employs a specific reference value. The reference value may be, for example, a random number, employee identification number or any other suitable identifying information. However, with out of band communications of such information, costly initialization procedures result. For example, in a corporation that has 100,000 employees, the out of band communications can require enormous amounts of resources. In addition, personnel typically must be available around the clock if a new user wishes to be initialized on a system at any time of day.

Some conventional systems use in band communications to provide pre-existing secret information that is known, for example, to a registration server. For example, pre-existing secret information may be, for example, an employee identification number stored on a registration server of the corporation. Such initialization methods typically generate an initial authentication key and/or reference value based on the pre-existing information and sends this information back to the client over a secure link. This may require, for example, a secured session to obtain initial authentication keys and reference values for initialization. However, known systems typically then discard the information and require regeneration of new information security authentication information such as random numbers after initial authentication has been granted, to continue use and access to the information security system. Problems can arise with known systems since known systems typically have to return an initial authentication key to an entity by a secured link or through an out of band communication.

Other known conventional systems require new information such as initial authentication keys and other identifying information be created. However, most information communication systems already employ some type of identifying information, such as employee numbers or other information, that is confidential which could be used to authenticate a particular user for access to an information security process. However, the shared information is typically kept in a back end data base and an information security system such as a software application may not use any other pre-existing shared information since the information may relate to other software applications. One solution has been to produce custom software applications for each different environment or to include a list of questions to be asked locally at the remote terminal which can be read by an application. However, the creation of new applications requiring their separate initial authentication keys and new reference values can require a great deal of development costs. Some systems provide a list of questions to request suitable access information. The access information is generated by each application. Also, the distribution of a list of questions does not typically allow different questions for different users unless it is known ahead of time that a particular user will be using a particular terminal. As such, there are environments where distributing reference values and initial authentication keys is not feasible. For example, when attempting to register a large number of geographically distributed users, providing each of them with a reference value and initial authentication keys can severely hamper deployment of the application.

Consequently, there exists a need for a system and method for initializing operation of an information security operation for an entity, that leverages pre-existing shared information, such as secret information, to assist in entity registration. In addition, such a system should be relatively automatic to allow secure automatic registration of an entity for use in security operation.

BRIEF DESCRIPTION OF THE DRAWINGS

The disclosed invention will be more readily understood in view of the below-listed drawings, wherein.

DETAILED DESCRIPTION OF THE PREFERRED EMBODIMENT

Generally, a method and apparatus for initializing operation for information security operation for an entity utilizes shared information, such as shared secret information, that may be shared between the entity and other applications or operations within a system to initialize an entity. The system and method stores inquiry data, such as data representing questions or forms containing questions, to facilitate entry of shared authentication data for initialization. The stored inquiry data is retrieved for presentation, in audible or visual form, based on received entity identification data, for example, entered by a user or otherwise obtained by a processing or entity seeking initialization. As such, the system and method produces an entity that, may for example, first ask a user for identifying information. The entity identification information, such as an employee number, or other information, is then provided to the entity. This information is then sent to a processing unit, such as a certification authority or other server. The processing unit determines what questions must be asked of the user to identify the user for initialization purposes. These questions are returned to the terminal for application wherein they are presented to the user. Once the information is collected, the various responses are concatenated together to form one data object which is then used to identify the individual. The responses to the questions may be communicated in any type of PAKE (Password Authenticated Key Exchange) type protocol, or any other suitable protocol.

Figure 1:
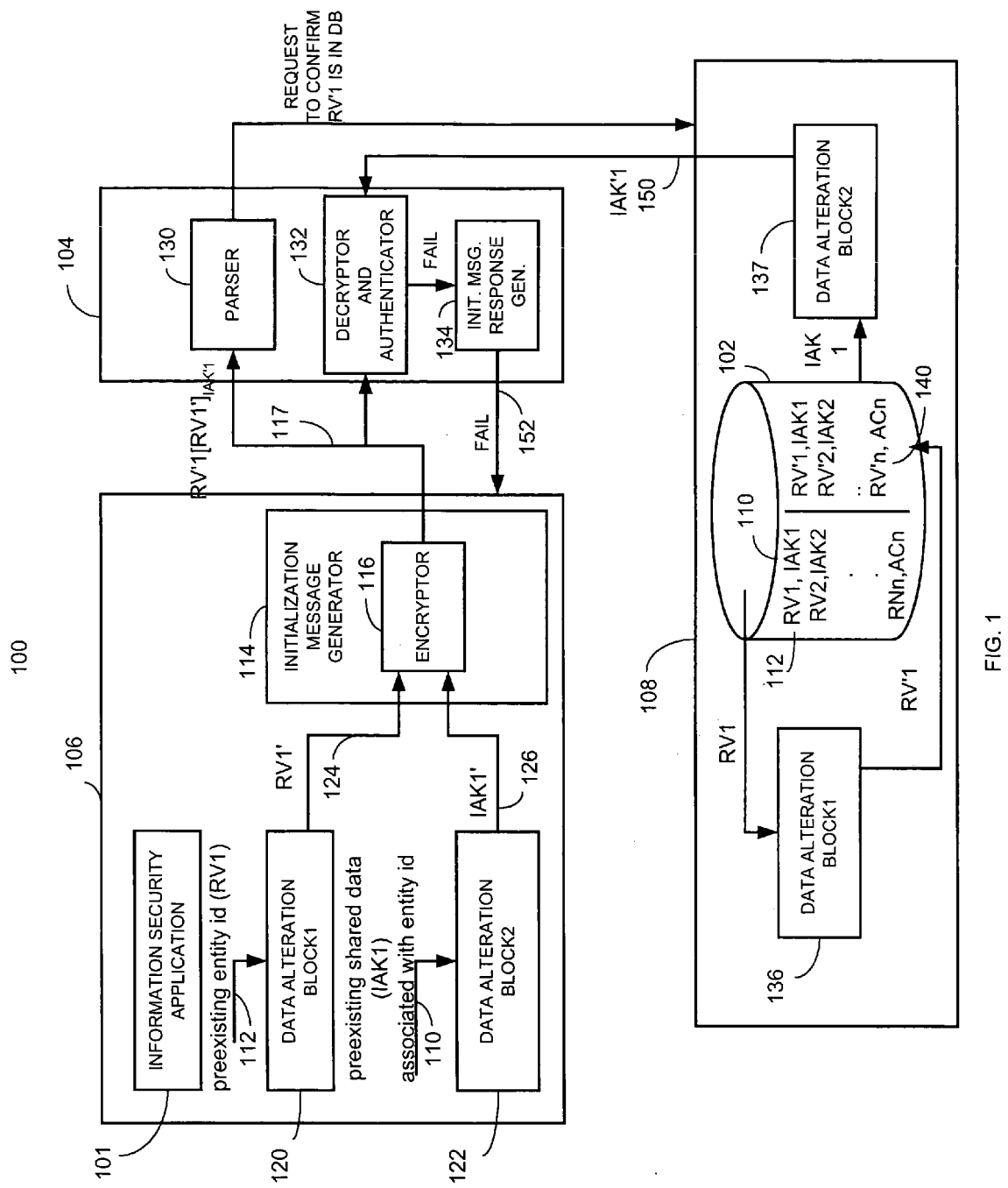
FIG. 1 is a block diagram illustrating one example of a system for initializing operation for an information security operation for an entity in accordance with one embodiment of the invention.

FIG. 1 illustrates a system 100 for initializing operation for an information security operation 101 for an entity, that includes memory 102, and initialization authentication unit 104 and a processing unit 106. The information security operation 101 may be, for example, symmetric key or public key based crypto operations including, for example, encryption, decryption, certificate usage, digital signatures, time stamping or any other function. The processing unit 106 may serve as the entity desiring access to an information security operation, and may also be, for example, a software application or any other suitable entity. For purposes of illustration, and not limitation, the processing unit 106 will be considered a node in a computer network and the initialization authentication unit 104 may be a server in the network while the memory 102 may be, for example, a back end data base maintained by another data base host such as a processing unit 108 that is operatively coupled to the initialization authentication unit 104. However, it will be recognized that the disclosed system and methods may be used in any suitable system employing information security operations, such as public key infrastructure systems, mobile telecommunication systems, and any other suitable information communication systems.

The memory 102 contains, for example, a data base having prestored entity identification data (RV) 112 such as a user's name that may have been entered due to use of another software application used or accessible by, for example, another node or the first processing unit 106 in the case where it is a computer node. The memory 102 also includes data representing shared data 110, such as shared secret information, that is associated with the entity identification data 112. The shared data 110, for example, the prestored shared information 110 may be values from, for example, a most recent pay stub, or tax return, pre-existing passwords, or any other suitable information that is uniquely associated with the entity identification data (such as a person's name). This prestored entity identification data and shared data is assumed to be known by the entity seeking initialization, or may be communicated out of band to the processing unit 106. In any event, the first processing unit 106 is coupled to receive the data representing the entity identification data 112 and the shared data 110 through, for example, a keyboard or other mechanism. The first processing unit 106 includes an initialization message generator 114 and an encryptor 116 that encrypts data based on the shared data 110. The initialization message generator 114 generates an initialization message 117 for the initialization authentication unit 104. The encryptor 116 may be any suitable encryption algorithm, a MAC, block cipher, digital signature algorithm or any other suitable encryption process. The initialization message generator 114 generates initialization message 117 that contains, in a clear text fashion, entity identification data 112 and encrypted data. In this example, the encrypted data includes encrypted entity identification data. The entity identification data is encrypted, for example, using the shared data 110 as an encryption key. In addition to the encrypted entity identification data, a non-encrypted version of the entity identification 112 is also communicated as part of the initialization message.

The initialization authentication unit 104 receives the communicated entity identification data and the encrypted data and compares the prestored shared data 110 (or a function thereof) to shared data derived from the encrypted data from the initialization message, to obtain the entity identification data. The initialization process uses the obtained entity identification data and the shared data as initialization registration data to register the entity as a proper user of the information security operation 101. The information security operation may be, for example, a public key based encryption and digital signature application or any other suitable information security application or operation. The registration of the entity is done in response to comparing prestored shared data obtained from the database to the shared data (or a function thereof) derived from the encrypted data in the initialization message 116. In addition to user names and other information, it will be recognized that shared secret data and/or the entity identification data may be, or consist of parts that are temporal data, such as a date, date and time, or other suitable temporal data. The use of temporal data helps to prevent replay of old messages at a later time. For example, a server can check that the temporal data is current. Receipt of old temporal data can be interpreted as a resend or replay of an old message.

The first processing unit 106, in another embodiment, includes data alteration blocks 120 and 122. These data alteration blocks may be any suitable algorithms that perform a data alteration function, such as, for example, public key encryption (RSA), a hash function, a password authenticated key exchange-type transformation, identity function, a MAC or any other suitable data alteration function. It should be noted that this alteration function may require further interaction with the initialization authentication unit or with the processing unit 108. In this embodiment, the entity identification data 112 is passed through the data alteration block 120 which generates first data 124 which is a function of the entity identification data 112. Similarly, the data alteration block 122 receives the shared data 110 and performs the appropriate function on the data and outputs second data 126 that is a function of the shared data 110. The encryptor block 116 then generates as part of the initialization message 117, an initialization message to the initialization authentication unit that contains, for example, the first data 124 that is a function of the entity identification data, as well as an encrypted form of the first data that is encrypted based on the second data 126. This message is represented as RV'[RV']$_{IAK}$.

The initialization authentication unit 104, such as a suitably programmed certification authority or other server, includes a message parser 130, a decryptor and authenticator 132, and an initialization message response generator 134.

The processor 108 includes, in addition to the memory 102 containing a database, data alteration blocks 136 and 137. These data alteration blocks are identical to data alteration blocks 120 and 122, respectively. It should be noted that these data alteration blocks may require further interaction with the processing unit 106 or with the initialization authentication unit. As shown, the database may include, for example, database entries in the form of a table that include a generated copy of the first data 140 with the prestored shared secret data 110.

The data authorization blocks 120, 122, 136 and 137, may be, for example, software modules such as .dll files or any other suitable hardware or software that perform any desired alteration of the data.

Figure 2:
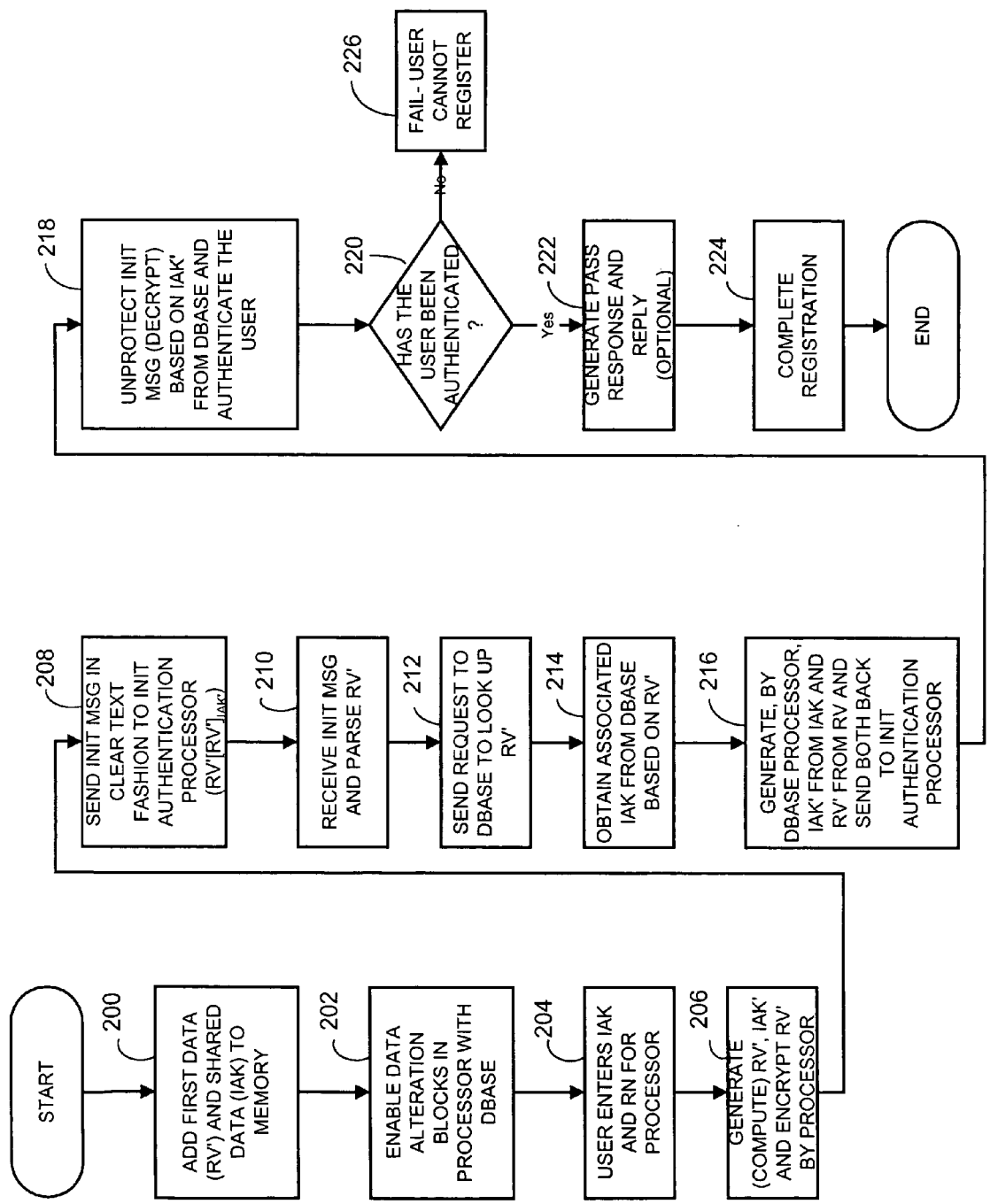
FIG. 2 is a flow chart illustrating one example of the operation of the system shown in FIG. 1.

Referring to FIG. 2, in operation, the system of FIG. 100 stores prestored data representing entity identification data 112 and shared data 110. In addition, the system preloads or generates a copy of the first data 140 along with the associated shared data 110 in the database. This is shown in block 200. As shown in block 202, the processor 108 enables the data alteration blocks 136 and 137. As shown in block 204, the user enters the entity identification data 112 and the shared data, 110, such as a shared secret password for use by the first processing unit 106. As shown in block 206, processing unit 106 generates the first data 124 and second data 126. As shown in block 208, the processing unit 106 sends the initialization message in a clear text fashion to the initialization authentication unit 104. This includes data to determine the integrity of the first data, based on the second data. As such, the process includes encrypting the first data, based on the second data. As shown in block 210, the initialization authentication unit 104 receives the initialization message and parses (e.g., extracts) the unencrypted first data portion of the initialization message. It then sends the extracted or parsed first data to the processor 108 so that the processor 108 can use the first data as an index to obtain, from the lookup table or database, the corresponding shared secret associated with the first data. This is shown in block 212. As shown in block 214, the processor 108 obtains the shared secret from the lookup table based on the first data. As shown in block 216, the processor 108 then generates a copy of the second data as a function of the extracted prestored shared secret data to generate a copy of the second data 150. In addition, the processor 108 may generate another copy of the first data 152 by passing the data 112 through data alteration block 136. This is done, for example, upon initialization to populate the database with data entries having entity identification data as modified by the alteration block, associated with unaltered shared secret data. As shown in block 218, the copy of the second data is then passed to the decryptor and authenticator 132 where the initialization message will be unprotected, which allows authentication of the user. The method of authentication and nature of unprotecting of the message will depend on the type of protection (encryption) used. As shown in block 220, if the copy of the user is authenticated the entity is granted access to the security operation and an optional response to the processor 106 indicating accepted registration is generated as shown in block 222. As shown in block 224, registration is completed by performing any other necessary processes. However, if the copy of the first data does not match the decrypted first data value, initialization will not be granted and a fail message 152 may be generated to inform the processor 106 of the failure. This is shown in block 226.

Stated another way, the method for initializing operation of the information security operation for an entity includes obtaining the prestored data representing the entity identification data 112, such as by the processor 106, and obtaining prestored data representing the shared secret data associated with the entity identification data, such as by the processor 106. The processor 106 then generates the first data 124 that is a function of the entity identification data 112. The process also includes generating second data 126 that is a function of the shared secret data 110, where the shared data is secret data, meaning it is shared by the processor 108 and processor 104 but is not generally known to other users. The process includes encrypting the first data 124 based on the second data 126 using a suitable encryption algorithm, such as a symmetric key-based algorithm, a MAC operation, digital signature or any other suitable operation as known in the art. The process includes communicating, by the initial message generator, in a clear text fashion, the entity identification data 124 along with the encrypted first data, for evaluation by the initialization authentication unit. The process also includes, such as during initialization, generating a copy of the first data 140 as a function of the prestored data representing the identification data, namely shared secret data 112. This may be done, for example, by the processor 108. The processor 108 also in any suitable manner such as using any suitable data base structure, may store the copy of the first data 140 with the prestored shared secret data 112 and database entries, table format, or any other suitable structure. The processor 108, extracts from a database entry, the prestored shared secret data 110 based on the communicated first data 124 from the initialization message.

The processor 108 also generates a copy of the second data 150 as a function of the extracted prestored shared secret data 110. The processor 108 communicates, for example, in a response message or makes available in some other fashion by providing the copy of the second data 150 for use authenticating the user and to obtain the entity identification data 124. Using the obtained entity identification data, such as the first data, in the shared secret data as initialization registration data, the system registers the entity as a proper user of the information security operation.

Accordingly, the system, among other things, avoids the need for a secure session between the processor 106 and the initialization authentication unit 104. In addition, there is no need to return an initial authentication key to the processor 106. As such, conventional additional communications are eliminated.

In addition, it will be recognized that any functions described herein may be suitably performed by any of the units described, and it will also be recognized that the various functions may be performed by hardware, firmware, software, discrete logic, or any suitable combination thereof. For example, decryptor 132 can be changed to an encryptor (like encryptor 116) to encrypt data 134 (obtained from initialization image 117) with the second data 150, whereafter the encryptor compares the initialization message 117 to the encrypted second data to see if they are the same. In another embodiment, instead of the server 104 performing the encryption, the encryption of the first data 140 is performed by the processor 108. It will be recognized that where the data alteration blocks are unit functions, meaning that no alteration has occurred, the entity identification data and the first data may be identical. Similarly, the shared data 110 and the second data 126 may also be identical if a unitary function is used as the data alteration block.

Figure 3:
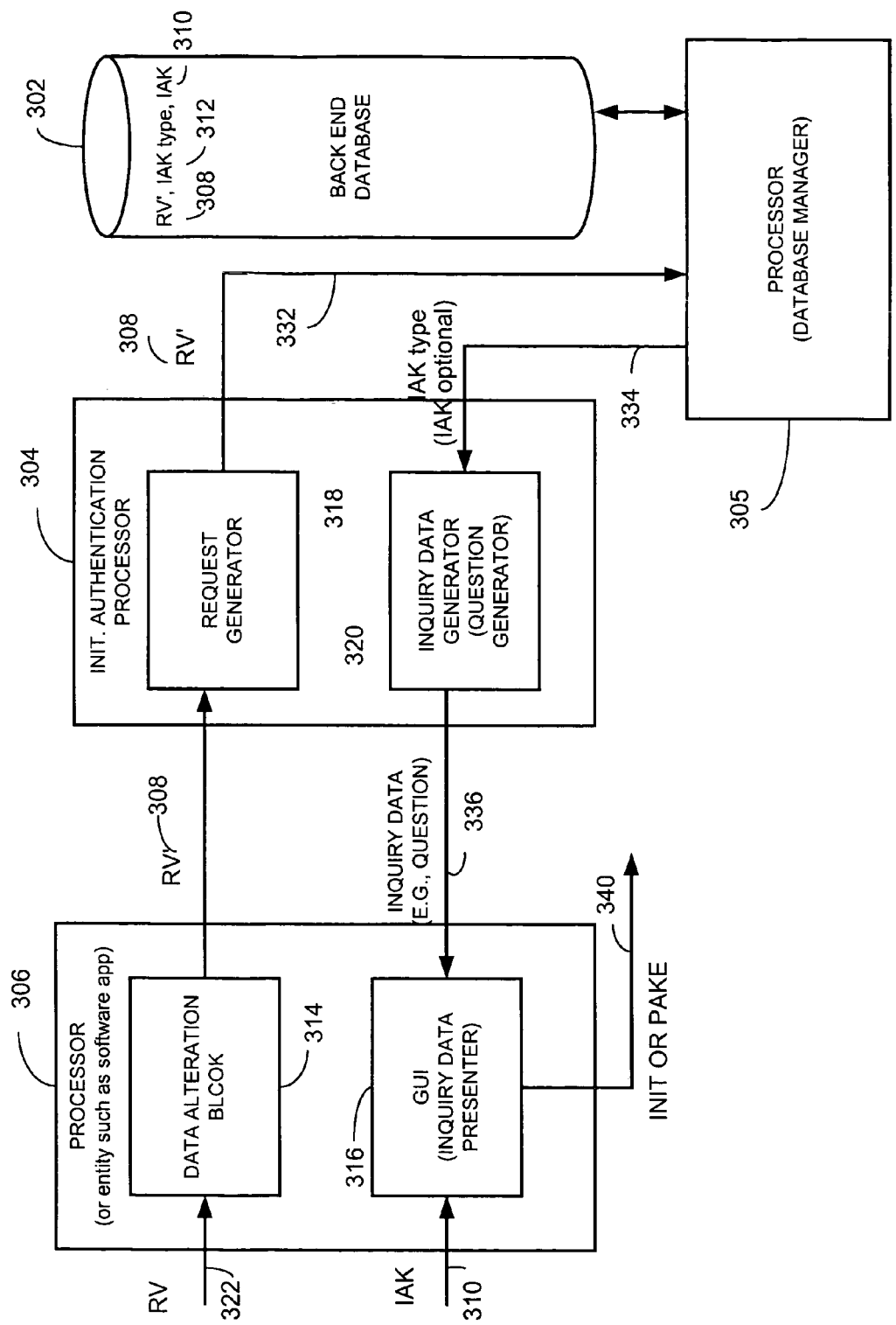
FIG. 3 is a block diagram illustrating one example of an apparatus for initializing operation of an information security operation for an entity, that includes an entity identification data driven automatic query in accordance with one embodiment of the invention.

Referring to FIG. 3, a system 300 for initializing operation for an information security operation includes memory 302, initialization authentication processor 304 and a processing unit 306. The memory 302 may be, for example, a back end database controlled by another processing unit 305. Similar to the above described system, memory 302, contains, in this example, a function (RV') 308 of entity identification data RV, associated shared authentication data IAK 310 and shared authentication type data 312. The IAK type data 312 may be, for example, data representing a type of shared authentication data, such data representing the type "Employee Identification Number" or data representing the type "Pre-Existing System Password". Alternatively, the database may contain one or more questions that are provided to an entity requesting access or initialization for an information security operation. The processing unit 306 may serve as the entity desiring access to the information security operation, may be a software application, or any other suitable entity. The processor 306 includes a data alteration block 314 as well as a graphic user interface 316. The initialization authentication unit 304 includes a request generator 318 and a question generator 320.

Figure 4:
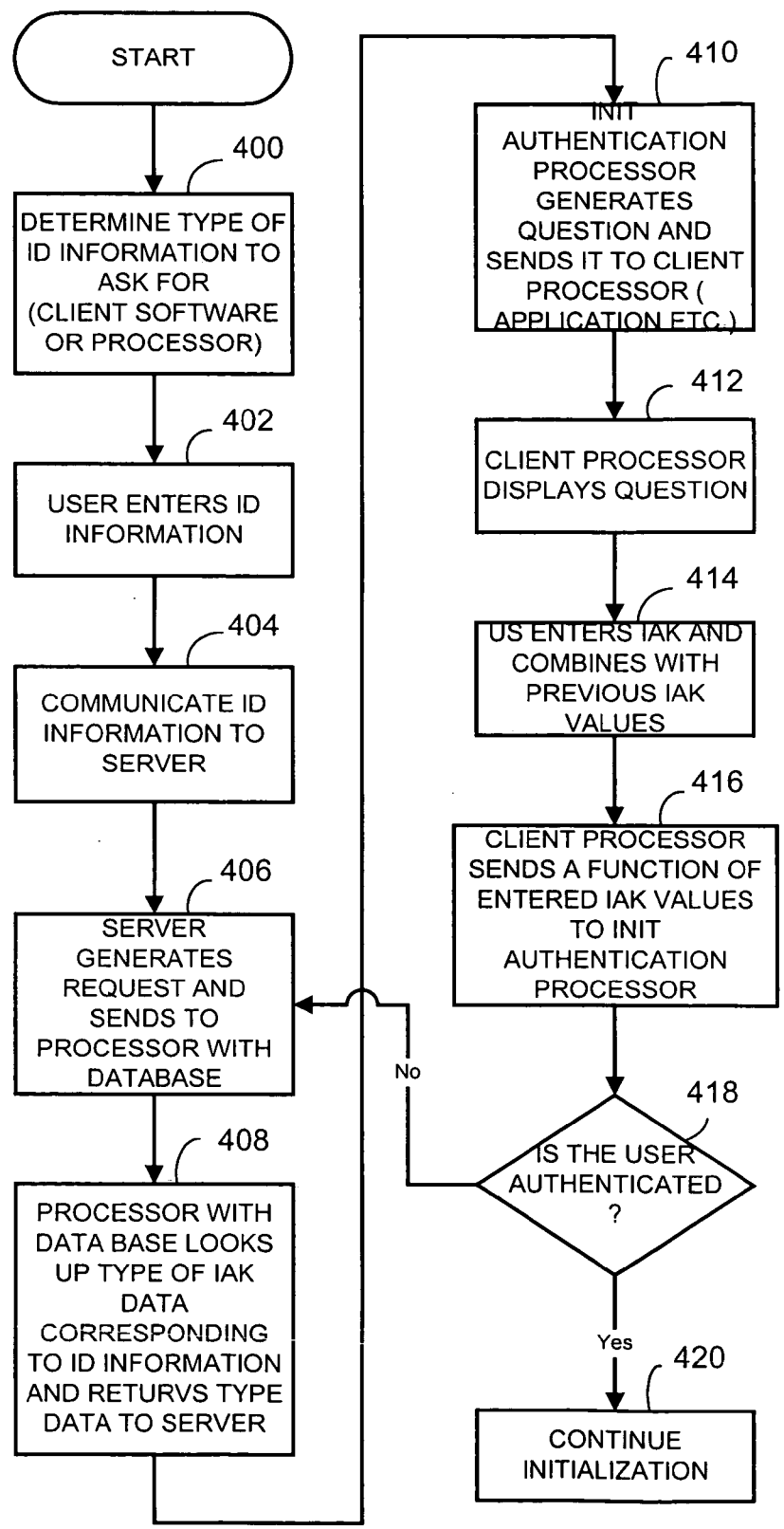
FIG. 4 is a flow chart illustrating the operation of the system of FIG. 3.

Referring to FIGS. 3 and 4, in operation, the processor 306 prompts a user, for example, to enter entity identification data 322, through, the graphic user interface. The type of entity identification information can be initialized ahead of time for all users. For example, each user of a corporation although many may be using a number of different software applications on different terminals, may be assigned an employee identification number which would serve, for example, as the entity identification information. This is shown, for example, in block 400. As shown in block 402, the user enters the entity identification data. The data alteration block 314 then generates data 308 representing a function of the entity identification data which is then communicated to the processor 304, as shown in block 404. This may be done, for example, using any suitable protocol, but may also be sent in clear text fashion. As shown in block 406, the processor 304 generates a database request 332 to request shared authentication type data associated with the function of the entity identification data 308. The processor 305 controlling the memory 302 looks up the shared authentication type data 312 and optionally the authentication data 310 (or optionally a function of the authentication data 310) that is associated with the function of the identification data 308 that has been prestored. The processor 305 controlling the memory 302 then returns the shared authentication type data 312 in a reply message 334 back to the requesting processor 304. This is shown in block 408. The initialization authentication processor 304 then generates one or more questions using question generator 320 to the processor 306. The question is indicated as 336. The question may be, for example, data representing a query for a user to prompt the user to enter shared authentication data that is associated with the identification data 322 that was originally entered and may be sent in the clear. This is shown in block 410.

As shown in block 412, the processor 306 presents the perceived question through a graphic user interface 316 or audible interface or any other suitable interface. As shown in block 414, the user then enters the shared authentication data 310 and the processor 306 concatenates the entered shared authentication data 310 with other data that has been entered in response to other questions based on the shared secret type data. While the responses are concatenated to form one data object which then is used to identify the individual. A function of the concatenated object 340 is then communicated to the processor 304 through a PAKE protocol or any other suitable protocol. As shown in block 416, the processor 306 sends the concatenated data to the server 304. The processor 304 then authenticates the user based on a concatenation of the received values IAK received from the database in message 334. As shown in block 418, if the user is not determined to be authenticated, the server requests and sends another request to the database requesting additional shared secret type data which will be returned in message 340, possibly using a different protocol than was used for previous questions. For example, the authentication processor 304 retrieves stored inquiry data, such as another question or set of questions, to obtain and receive additional shared authentication data in response to the presented additional question(s). The authentication processing device 304 compares the received shared authentication data with the stored shared authentication data to determine whether to initialize operation. This retrieving of additional inquiry data may occur repeatedly to provide all levels of necessary questions. However, if the user is authenticated, the process continues to allow initialization as shown in block 420. As such, the processor 304 compares the received shared authentication data with stored shared authentication data to determine whether to initialize operation of the information security operation.

Figure 5:
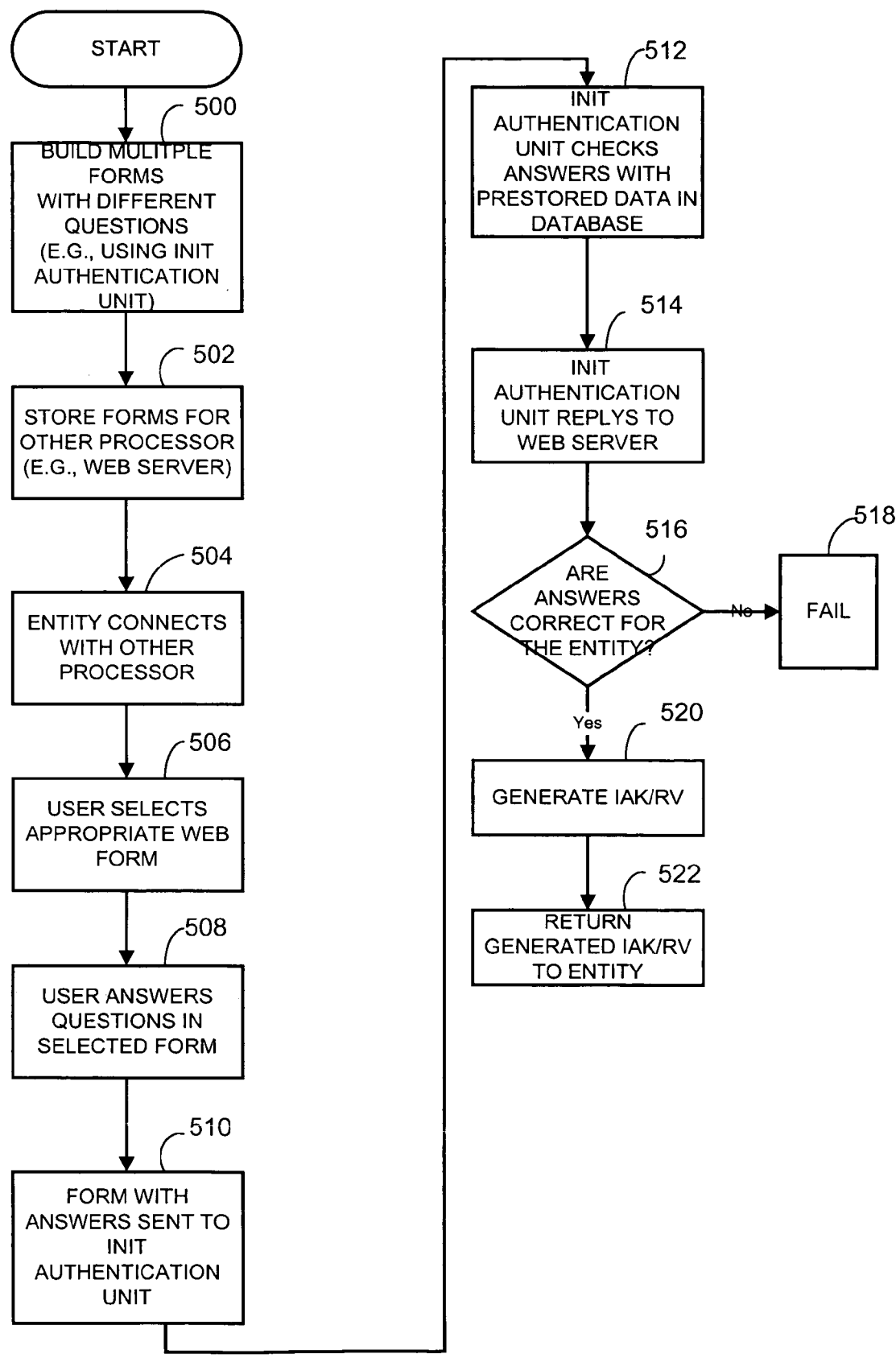
FIG. 5 is a flow chart illustrating an alternative method for initializing operation of an information security operation in accordance with one embodiment of the invention.

In an alternative embodiment, FIG. 5 illustrates a method for storing a plurality of forms containing questions wherein different forms are stored for different types of shared authentication data and are selectable through the user interface. This is in contrast to the method of FIG. 4 wherein a plurality of questions are indexed based on at least the typed of shared authentication data. The indexed questions are automatically selected for presentation based on received entity identification data.

As shown in block 500, a user through a graphic user interface, builds different question-based forms that are later presented to a user to prompt a user to enter various authentication type information. As shown in block 502, the forms are added to a web server or other processing unit, such as unit 302. An entity connects to the web server, such as processor 304, as shown in block 504. All of the forms are then presented to a user and the user selects the appropriate form as shown in block 506. The user then enters entity identification information and shared authentication data based on the questions as shown in block 508. It should be noted at this point that in an alternative embodiment the entity identification information and shared authentication data entered by the user may be used directly in a PAKE protocol or other appropriate protocol to initialize the user. As shown in block 510, the form is then submitted to the initialization authentication unit 304. The initialization authentication unit 304 checks the answers to the questions by determining if the answers are stored in the database memory 302. This is shown in block 512. If the correct answer is stored with the associated shared secret identification data, the database processor replies to the server 304 as shown in block 514. As shown in block 516, the processor 304 determines if the correct information is stored in back end database. If not, the initialization process fails as shown in block 518. However, if the correct answers to the questions are already stored in the back end database, the process continues by generating the shared secret data and entity identification data as shown in block 520. The shared secret data can be generated at random as known in the art or injected to a public key infrastructure as enrollment data as indicated for example, in co-pending application Ser. No. 09/430,879 entitled "System and Method for Initializing Operation for an Information Security System". The initialization information, namely the shared authentication data and the entity identification data is then returned to processor 306 as shown in block 522, which is then used by the information security application to finalize initialization.

In addition, the system as illustrated, for example in FIGS. 1 and 3, may consist of a plurality of processing units, such as 106, 104, and 108 that may process executable instructions that are stored on one or more storage mediums or are downloadable from one or more storage mediums. Accordingly, storage medium such as CD ROM, hard drive, RAM, ROM or any other suitable storage medium may be suitably programmed to contain executable instructions that allow the various processors to perform the functions of the system as disclosed herein.

It should be understood that the implementation of other variations and modifications of the invention in its various aspects will be apparent to those of ordinary skill in the art, and that the invention is not limited by the specific embodiments described. For example, any data stored in memory may be further compressed, encrypted or otherwise altered. It is therefore contemplated to cover by the present invention, any and all modifications, variations, or equivalents that fall within the spirit and scope of the basic underlying principles disclosed and claimed herein.

What is claimed is:

1. A method for initializing operation of an information security operation for an entity, comprising the steps of:
    storing at least one of: entity identification data and a function of entity identification data and storing associated shared authentication data;
    storing inquiry data to facilitate entry of shared authentication data for initialization;
    retrieving the stored inquiry data for presentation based on received entity identification data;
    receiving shared authentication data in response to the presented inquiry data;
    comparing received shared authentication data with the stored shared authentication data; and
    determining whether to initialize operation of the information security operation based on the comparison.

2. The method of claim 1 wherein the step of storing inquiry data includes storing at least one of: a plurality of forms containing questions wherein different forms are stored for different types of shared authentication data and are selectable through a user interface, and a plurality of questions indexed based on at least type of shared authentication data that are automatically selected for presentation based on received entity identification data.

3. The method of claim 1 including the steps of:
    storing data representing a function of the entity identification data and storing shared authentication type data;
    subsequently generating data representing a function of the received entity identification data;
    obtaining the stored shared authentication type data based on the subsequently generated data representing a function of the received entity identification data; and
    selecting, under control of a processing unit, stored inquiry data for presentation to a user, based on the obtained stored shared authentication type data.

4. The method of claim 1 wherein the step of initializing the operation of the information security operation includes the use of a PAKE or other appropriate protocol.

5. The method of claim 1 wherein the step of determining whether to initialize the operation of the information security operation includes repeating the steps of:
    retrieving stored inquiry data for presentation based on received entity identification data;
    receiving shared authentication data in response to the presented inquiry data and combining with previously received authentication data;
    comparing received shared authentication data with the stored shared authentication data; and
    determining whether to initialize operation of the information security operation based on the comparison.

6. A method for initializing operation of an information security operation for an entity, comprising the steps of:
    storing, by a first processor, at least one of: entity identification data and a function of entity identification data and storing associated shared authentication data;
    storing, by a second processor, inquiry data to facilitate entry of shared authentication data for initialization;
    retrieving, by the second processor, the stored inquiry data for presentation based on received entity identification data;
    receiving, by a third processor, shared authentication data in response to the presented inquiry data;
    comparing received shared authentication data with the stored shared authentication data; and
    determining whether to initialize operation of the information security operation based on the comparison.

7. The method of claim 6 wherein the step of storing inquiry data includes storing at least one of: a plurality of forms containing questions wherein different forms are stored for different types of shared authentication data and are selectable through a user interface, and a plurality of questions indexed based on at least type of shared authentication data that are automatically selected for presentation based on received entity identification data.

8. The method of claim 7 including the steps of:
    storing data representing a function of the entity identification data and storing shared authentication type data;
    subsequently generating data representing a function of the received entity identification data;
    obtaining the stored shared authentication type data based on the subsequently generated data representing a function of the received entity identification data; and
    selecting, under control of the second processing unit, at least one of the plurality of questions indexed based on type of shared authentication data for presentation, based on the obtained stored shared authentication type data.

9. The method of claim 6 wherein the step of initializing the operation of the information security operation includes the use of a PAKE or other appropriate protocol.

10. The method of claim 6 wherein the step of determining whether to initialize the operation of the information security operation includes repeating the steps of:
    retrieving stored inquiry data for presentation based on received entity identification data;
    receiving shared authentication data in response to the presented inquiry data and combining with previously received authentication data;
    comparing received shared authentication data with the stored shared authentication data; and determining whether to initialize operation of the information security operation based on the comparison.

11. A system for initializing operation of an information security operation for an entity, comprising:

a first processor, storing at least one of entity identification data and a function of entity identification data and storing associated shared authentication data;

a second processor operatively coupled to the first processor, storing inquiry data to facilitate entry of shared authentication data for initialization and retrieving the stored inquiry data for presentation based on received entity identification data;

the entity operative to receive shared authentication data in response to the presented inquiry data; and wherein the second processor compares received shared authentication data with the stored shared authentication data and determines whether to initialize operation of the information security operation based on the comparison.

12. The system of claim 11 wherein the first processor stores at least one of: a plurality of forms containing questions wherein different forms are stored for different types of shared authentication data and are selectable through a user interface, and a plurality of questions indexed based on at least type of shared authentication data that are automatically selected for presentation based on received entity identification data.

13. The system of claim 11 wherein:

the first processor stores data representing a function of the entity identification data and stores shared authentication type data; and the second processor subsequently generates data representing a function of the received entity identification data and obtains the stored shared authentication type data based on the subsequently generated data representing a function of the received entity identification data, and selects at least one of the plurality of questions indexed based on type of shared authentication data for presentation, based on the obtained stored shared authentication type data.

14. The system of claim 11 wherein the second processor includes a request generator and a question generator and wherein the entity includes a graphic user interface for presenting questions received from the second processor.

15. The system of claim 11 wherein the second processor initializes the information security operation using a PAKE or other appropriate protocol.

16. The system of claim 11 wherein the second processor determines whether to initialize the operation of the information security operation by repeating the steps of:

retrieving stored inquiry data for presentation based on received entity identification data;

receiving shared authentication data in response to the presented inquiry data and combining with previously received authentication data;

comparing received shared authentication data with the stored shared authentication data; and determining whether to initialize operation of the information security operation based on the comparison.

* * * * *